July 31, 1962 W. D. CARTER 3,046,606
PROCESS FOR PRODUCING SOLID NON-POROUS PELLETS FROM
POLYOLEFINS AND PELLETS PRODUCED THEREBY
Filed July 29, 1959
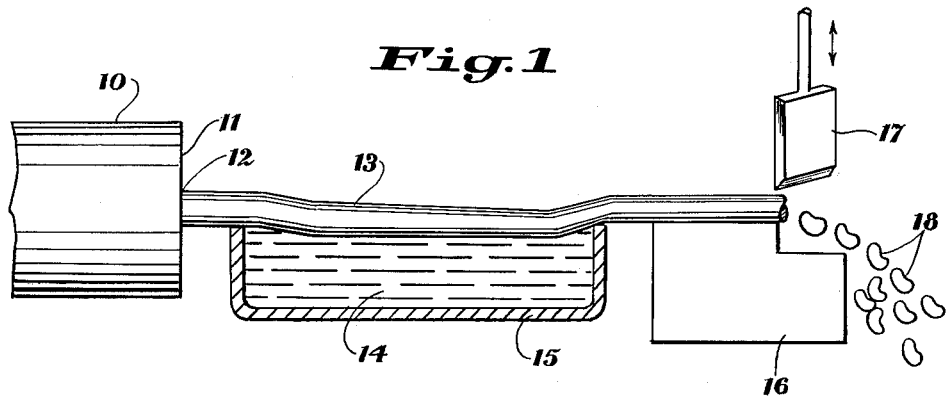
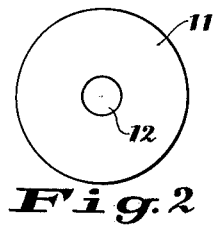
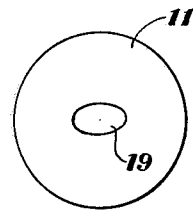
William D. Carter
INVENTOR.
BY R. Frank Smith
Walter O. Hodsdon
ATTORNEYS

United States Patent Office 3,046,606
Patented July 31, 1962

3,046,606
PROCESS FOR PRODUCING SOLID NON-POROUS PELLETS FROM POLYOLEFINS AND PELLETS PRODUCED THEREBY
William D. Carter, Kingsport, Tenn., assignor to Eastman Kodak Company, Rochester, N.Y., a corporation of New Jersey
Filed July 29, 1959, Ser. No. 830,218
4 Claims. (Cl. 18—47.5)

This invention relates to a process of forming solid, non-porous pellets from polyolefins.

Heretofore, polyolefin pellets suitable for use in extrusion and molding operations have been made by heating the polyolefin to plasticity and extruding it through an orifice to form a continuous rod of a diameter substantially similar to the diameter desired for the pellet. The rod is continuously cooled by immersion in a water bath, and after being cooled to a satisfactory cutting temperature, is transversely cut into short lengths thus producing pellets.

However, this prior method of forming polyolefin pellets had the disadvantage that the resulting pellets were not dense and solid. When the hot extruded rod was immersed in the water bath for cooling purposes, the outer surface cooled first and hardened. Then as the interior of the rod cooled and contracted, numerous contraction voids were formed within the rod because the rigid outer surface could not be deformed to allow for this contraction.

An object, therefore, of the present invention is to provide polyolefin pellets which have a solid non-porous structure.

Another object of this invention is to provide a continuous process for making polyolefin pellets which have a solid non-porous structure.

Other objects will appear hereinafter.

In accordance with this invention, these objects are attained by heating polyolefin to plasticity and extruding it through a die in the form of a rod. This hot plastic rod, which has a specific gravity less than water, is floated on the surface of a water bath until it is cooled substantially below the plasticity temperature.

During this cooling the floating rod is not "wetted" by water so that ¼ to ⅓ of the upper surface of the rod is not in direct contact with the cooling water. The portion of the bottom surface of the rod which is in contact with the water is cooled rapidly and becomes rigid, but the upper portion and the interior of the rod cools more slowly and remains pliable. As the inside of the rod continues to cool and contracts, a longitudinally extending crease forms in the upper surface of the rod which is still soft but this contraction produces no voids in the rod. The rod is then cut transversely into short lengths to form pellets which are likewise of a solid and dense structure. In the subsequent use of these pellets, for molding or extrusion, the solid pellets of this invention will provide more polymer, than the pellets with contraction holes, for equivalent bulk volume of pellets. This permits commercial molders and others, to use higher rates of molding and re-extrusion with consequent economic advantages. Also the pellet manufacture can employ smaller packages for the same weight of pellets.

The invention is further described in the following description with reference to the drawings in which:

FIG. 1 is a schematic view partly in section of extrusion and cooling and cutting apparatus suitable for making pellets in accordance with this invention;

FIG. 2 is the face view of an extrusion die having a circular die orifice therein;

FIG. 3 is a cross-section of a pellet resulting from the process when the circular die is employed;

FIG. 4 is the face view of an extrusion die having an elliptical die orifice therein;

FIG. 5 is a cross-section of a pellet resulting from the process when the elliptical die is employed.

Referring to FIG. 1 there is shown an extrusion head 10 of a conventional extruder having a die 11 and a circular orifice 12 therein. A continuous round rod of the selected polyolefin 13 is extruded from the die and conducted across the surface of the water 14 in water bath 15. The water in the bath may be maintained at a desired level and at a desired temperature by conventional means, not shown. As the round thermoplastic rod contacts the surface of the water it becomes rapidly cooled on its lower surface to a rigid state. The remainder of the rod cools more slowly and gradually contracts to assume the solid, non-porous heart-shaped cross-section shown in FIG. 3.

The heart-shaped rod is now introduced into the cutter mechanism 16 whose reciprocating knife 17 transversely cuts the rod into pellets 18 of a desired length and heart-shaped cross-section. Conventional means, not shown, may be provided to synchronize the movement of the rod and knife to achieve the required number of cuts per unit length of the rod.

By employing an elliptical die orifice 19 such as shown in FIG. 4 instead of a circular die orifice a rod cross-section of a shape such as shown in FIG. 5 at 20 can be made. When this rod is cut the resulting pellets will have a cross-section such as shown in FIG. 5.

The water bath can be advantageously maintained at 20° C. A water path of 9 to 10 feet works well with an extrusion rate of 30 feet per minute. The polyolefin can be extruded at temperatures in the range of 220 to 330° C. The diameter of the rod being extruded may be preferably about 3/16 to ¼ inch.

The invention is further described in the following description with reference to the drawings in which:

*Example 1*

A rod of polypropylene was cooled by floating it for approximately 9 feet on the surface of a water bath. The extrusion rate was 11 lb./hr. The speed of the polymer rod was 30 ft./min. The temperature of the material leaving the die was 220 to 224° C. The water bath was filled with filtered water at approximately 20° C. The rod was less than 3/16 inch in diameter. The rod collapsed to a "heart-shaped" cross-section and was free of contraction holes.

*Example 2*

Polypropylene was extruded and cooled by floating on the surface of the water bath. The temperature of the extrusion was 320 to 330° C. and the rate was 11 lb./hr. The rod speed was 30 ft./min. Because of the elevated temperature, it was necessary to submerge the rod for 10 to 12 inches in order to adequately cool it in the 10 ft. water bath. Even though the whole surface of the rod had been slightly cooled, the rod was able to collapse partially and not form contraction holes from cooling. The rod was less than 3/16 inch in diameter. The water bath was filled with water at about 20° C. The cross-section of the rod was heart-shaped and sometimes figure-eight shaped.

*Example 3*

Polypropylene was extruded from an elliptical shaped die with a ratio of major axis to minor axis of 3 to 2. It was cooled by floating on the water bath for about 9 feet. The temperature of the extrusion was 220 to 230° C. The temperature of the water was 20° C. The extrusion rate was 12 lb./hr. The speed of the rod was 30 ft./min. The diameter of the rod was less than ¼ inch on the major axis. Because of the shape of the rod, a larger percentage of the surface was uncooled than with a circular rod, the contraction did not form a sharp crease, but instead the collapsed rod had the cross-section shown in FIG. 5.

This process operates on thermoplastics having a specific gravity less than water and preferably they should not be wetted by water. The polymer also should have a low rate of heat conductivity so that the underside of the rod will cool much faster than the upper. The collapsing of the cooled rod can be observed on other types of extruded polymers in addition to polypropylene, provided the rods float on water and cool slowly enough to allow one side to collapse before the surface hardens.

The shape of the initial cross-section of the extruded rod may also be varied somewhat from those shown in the drawings and still be productive of solid pellets.

I claim:
1. The process for preparing solid, non-porous pellets of thermoplastic material which comprises extruding a rod of hot, thermoplastic material, floating the rod on the surface of a cooling liquid inert thereto to cause rapid cooling of the surface of the rod contacting the liquid to a rigid state with slower cooling of the remaining portion of the surface of the rod and concomitant contraction of the upper portion of the rod, and cutting the rod into short lengths to form pellets.

2. The process of claim 1 in which the thermoplastic material is a polyolefin.
3. The process of claim 2 in which the polyolefin is polypropylene.
4. The process of claim 3 in which the polypropylene is extruded at a temperature within the range of 200° C. to 330° C., and the cooling liquid is water having a temperature of approximately 20° C.

References Cited in the file of this patent

UNITED STATES PATENTS

| | | |
|---|---|---|
| 2,311,389 | Hawks et al. | Feb. 16, 1943 |
| 2,314,378 | Van Rossen | Mar. 23, 1943 |
| 2,373,593 | Pease | Apr. 10, 1945 |
| 2,452,884 | Werner | Nov. 2, 1948 |
| 2,708,813 | Bourgeaux | May 24, 1955 |
| 2,746,086 | Vickers | May 22, 1956 |
| 2,952,038 | Goins et al. | Sept. 13, 1960 |

FOREIGN PATENTS

| | | |
|---|---|---|
| 1,145,727 | France | Oct. 29, 1957 |
| 733,720 | Great Britain | July 20, 1955 |
| 809,273 | Great Britain | Feb. 18, 1959 |